Figure 1:
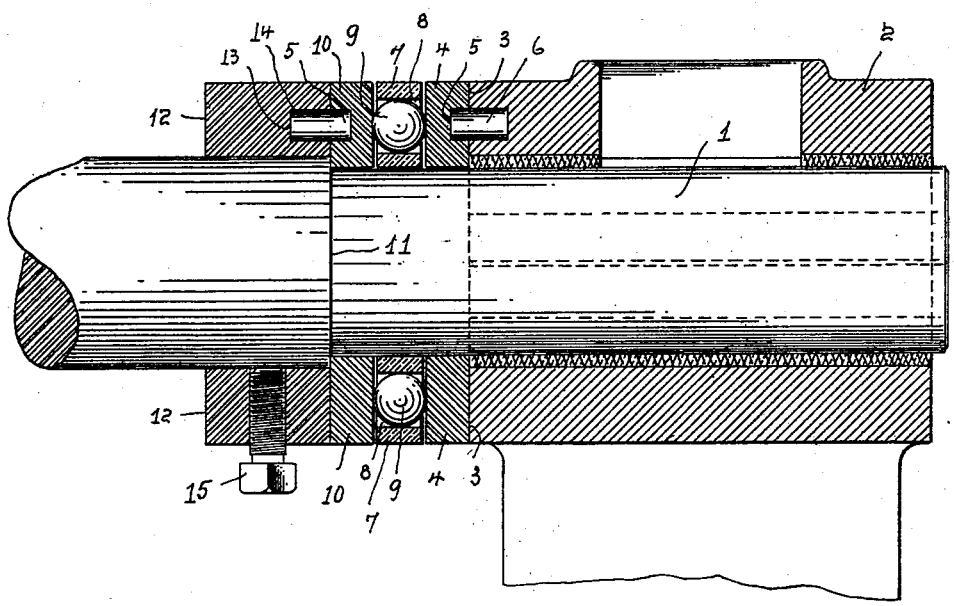

No. 706,114. Patented Aug. 5, 1902.
A. RUEDY.
BALL THRUST BEARING.
(Application filed May 22, 1902.)
(No Model.)

Witnesses
C. W. Klauser
H. P. Delaney

Inventor
Albert Ruedy
By Wilson & Martin
His Attorneys

UNITED STATES PATENT OFFICE.

ALBERT RUEDY, OF TOLEDO, OHIO.

BALL THRUST-BEARING.

SPECIFICATION forming part of Letters Patent No. 706,114, dated August 5, 1902.

Application filed May 22, 1902. Serial No. 108,459. (No model.)

*To all whom it may concern:*

Be it known that I, ALBERT RUEDY, a citizen of the United States, residing at Toledo, in the county of Lucas and State of Ohio, have invented a new and useful Improvement in Ball Thrust-Bearings, of which the following is a specification.

My invention relates to an improvement in ball thrust-bearings, and has for its object to provide a simple, durable, and effective bearing of the kind that is economical in construction and the parts of which are readily assembled and renewable and that will greatly reduce friction. I accomplish these objects by constructing a bearing of the kind as hereinafter described, claimed, and illustrated in the drawings.

Figure 2:
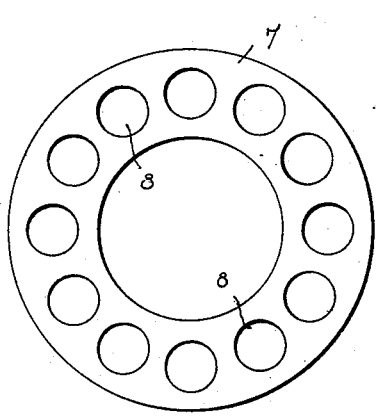
Figure 3:
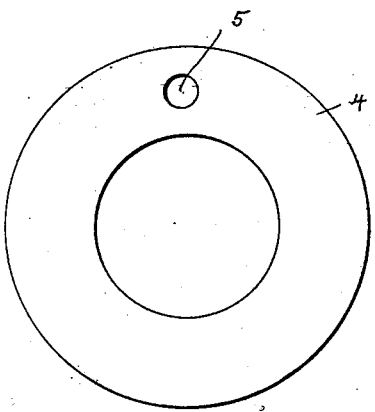

In the drawings, Figure 1 is a transverse longitudinal section through a thrust-bearing constructed in accordance with my invention. Fig. 2 is an elevation of a ball cage-ring provided with apertures for the ball-bearings, and Fig. 3 is an elevation of a facing-ring provided with an aperture for engagement with a pin.

In the drawings, 1 designates the shaft, which is journaled in suitable bearings 2 (only one being shown) of a machine, which are provided with a thrust-bearing face 3 around the bore of the bearings. On one side of the bearing there is mounted upon the shaft a collar or bearing-ring 4, having flat faces and adapted to operate as a bushing-ring to protect the face 3 of the bearing. The ring 4 is provided with a side aperture 5, extending half-way through the body of the ring, and the aperture is of a diameter to receive a retarding-pin 6, which is secured to the bearing 2 and projects from the face 3 of the bearing.

7 designates an annular ball cage-ring mounted on the shaft and provided with a plurality of cylindrical apertures extending transversely through the ring in a circle concentric to the shaft, and said apertures are of a diameter to freely receive within them the balls 9. The balls 9 are of slightly-greater diameter than the thickness of the cage-ring, whereby opposite portions of the periphery of the balls extend beyond each side of the cage-ring 7.

10 designates a flat-faced annular ring similar to ring 4 and is provided with a like aperture 5, extending half-way through the body portion of the ring. From the ring 10 the body of the shaft 1 is slightly increased in diameter, forming a shoulder 11, and upon the diametrically-increased portion of the shaft there is mounted a collar 12, provided with an aperture 13, in which is inserted a pin 14, adapted to engage the aperture 5 in the ring 10 and prevent the independent rotation of the ring 10 upon the shaft when the collar is tightened upon the shaft by means of set-screws 15 or by other suitable means.

When the parts are assembled as described, it will be seen from the foregoing that I have provided a thrust-bearing of inexpensive structure that is readily removable and renewable and when applied to a shaft having an end thrust the wear and friction of the bearing are greatly reduced.

What I claim to be new is—

In a ball thrust-bearing, the combination of a shaft having a reduced end portion forming a shoulder; a bearing having a socket or bore to receive the end of the shaft, there being a bearing-face around the socket or bore of the bearing, and a pin projecting from the face; a flat-faced bearing-ring mounted on the shaft and provided with a socket on one side to receive the pin of the bearing, a collar having one side faced and provided with a pin projecting from the face, mounted and secured on the shaft with its face concentric and flush with the face of the shoulder of the shaft; a flat-faced bearing-ring mounted on the shaft having an aperture in one face adapted to receive the pin of the collar; a flat-faced ball cage-ring having cylindrical ball-apertures transverse through the sides and in a circle concentric around the bore of the ring mounted on the shaft between the bearing-rings and balls in the apertures having greater diameter than the thickness of the cage, substantially as shown and described.

In witness whereof I have hereunto set my hand this 20th day of May, A. D. 1902.

ALBERT RUEDY.

Witnesses:
F. S. MACOMBER,
ANNA M. FRIEDRICHS.